UNITED STATES PATENT OFFICE.

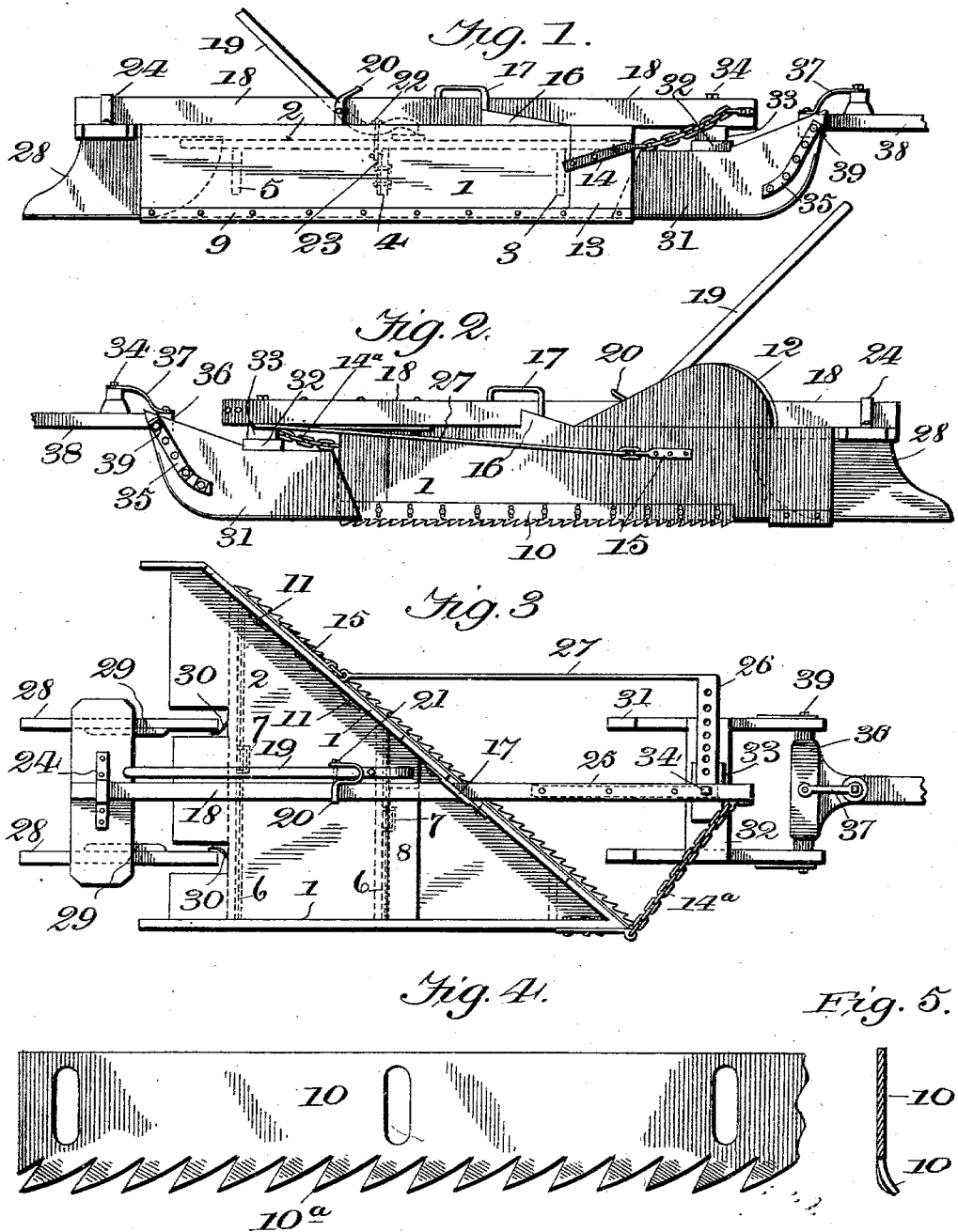

FREDRICK OLSON, JACOB KAISER, AND JOHN KNIVEL, OF CALUMET, MICHIGAN.

SNOW-PLOW.

SPECIFICATION forming part of Letters Patent No. 629,917, dated August 1, 1899.

Application filed September 16, 1898. Serial No. 691,109. (No model.)

*To all whom it may concern:*

Be it known that we, FREDRICK OLSON, JACOB KAISER, and JOHN KNIVEL, citizens of the United States, residing at Calumet, in the county of Houghton, State of Michigan, have invented certain new and useful Improvements in Snow-Plows, of which the following is a specification, reference being had therein to the accompanying drawings.

This invention relates to snow-plows, and particularly to a construction which can be used as a plow or as a surface-roughener in connection with the plow.

The invention has for its object to provide a construction by which the plow is supported upon suitable carriages and can be elevated or depressed as desired and to a construction by which the angle of draft can be varied to present the plow at the proper inclination for different character of material to be removed.

It has as a further object to provide a particular construction of knife and of blades whereby the surfaces may be roughened and the side thrust obviated.

Other objects and advantages of the invention will hereinafter appear in the following description and the novel features thereof particularly pointed out in the appended claims.

In the drawings, Figure 1 is a side elevation of the plow. Fig. 2 is a similar view from the opposite or angle face. Fig. 3 is a top plan. Fig. 4 is a detail elevation of the roughening-blade, and Fig. 5 is a vertical section of the same.

Like numerals of reference indicate like parts throughout the several figures of the drawings.

The sides 1 of the plow proper are connected together in an angular form, so as to present one surface at substantially an angle of forty-five degrees to the other. These sides are provided with suitable cross-pieces or stiffeners 3, 4, and 5, upon which the top 2 is applied. The sides are also suitably braced by tie-rods 6, which are provided with buckles 7, engaging the reverse threads upon the rods and by means of which the rods can be properly tightened. The upper surface of the top 2 is provided with a bearing-board 8 and the straight side 9 of the plow with a steel blade 9, which extends slightly below the surface of the side to insure a positive hold against lateral movement of the plow and to afford a proper scraping-surface. The angle side is likewise provided with a blade 10 of particular construction, as shown in Fig. 4, and having a series of teeth $10^a$ bent at an angle to the blade and in the direction of draft of the plow. These blades 10 extend slightly below the bottom of the side and are secured by suitable bolts passing through elongated apertures in the blade, by which the vertical adjustment of the blade is permitted. The blade may be omitted if it is not desired to roughen the surface scraped, and any suitable scraper-blade may be applied in its place or the edge of the side used for the scraping action. The slots are so located as to permit the upward movement of the blade above the bottom of the side, and thus remove the same from action when desired. The angle side of the plow is provided with suitable socket-plates 11 for the reception of drop-pins carried by the side wing 12. This wing is intended for use in removing deep snow or snow which accumulates at the outer portion of the side. The nose of the plow is also suitably shod with metal, as at 13, and provided with a strap 14 for the attachment of a draft-chain $14^a$. A similar strap 15 is applied to the angle side of the plow and also adapted to be connected to a draft device. The upper edge of the angle-face of the plow has secured thereto guide-blocks 16, suitably spaced apart and connected by a loop 17. These blocks may be of any desired shape, but preferably wedge shaped, as shown. Between these guide-blocks and through the loop 17 extends a supporting-beam 18, which at its opposite ends is supported upon and carried by suitable carriages—for instance, sleds, as illustrated. The guide-blocks 16 limit the lateral movement of the plow upon this beam, and the loop 17 limits its vertical movement while allowing a suitable play of the plow in passing over obstructions. The beam 18 has pivoted thereto a lever 19 in any suitable manner—for instance, by means of the loop 20 and blade 21, as shown—the said bolt passing through the beam and lever, while the loop provides a support and bracing connection therefor. Extending downward from this lever is a rod or link 22, having an eye at its lower portion, adapted to engage a hook 23, secured to the cross-piece 4 of the body of the plow. The lower end of the lever 19 bears upon a suitable wear-plate carried by the bearing-board 8, so that when the lever is thrown forward the plow is forced downward and when the lever is thrown backward the plow will be elevated through the connection therewith.

The rear end of the beam 18 is secured to the carriage or sled by means of the loop or strap 24, bolted to the sled, while the front end of the beam is provided upon its under surface with a plate 25, which coöperates with a gear-plate 26, extending at right angles thereto and provided with a series of adjusting-apertures, as illustrated. The opposite end of the plate 26 is provided with a draft-rod extending to and connecting with the strap 15, carried by the inclined face of the plow. It will be seen that the king-bolt which passes through the beam 18 and front sled may be removed and placed in another adjusting-aperture upon the plate 26 when it is desired to alter the inclination of the angle-face of the plow relative to the front sled. It is desirable to regulate this inclination for different classes of work and different character of material to be removed, as the draft required can best be applied when the angle-face of the plow is presented at the proper inclination for any particular character of work—for instance, removing wet or dry snow. This adjustment of the plow is permitted by means of the flexible chain connections between the front and rear carriages or sleds. The rear sled is provided with suitable runners 28, which are stiffened by brace-blocks 29 and yieldingly connected with the plow by means of chains 30. At the point of connection with the plow the runners of the rear sled are located within cut-away portions of the plow-body. The front sled is provided with similar runners 31, connected by a cross-piece 32, having thereon a bearing-block 33, upon which the gear-plate 26 rests and through which the king-bolt 34 passes. These runners are provided at one end with straps 35, through which a pivoting-bolt 39 passes and upon which bolt the usual pole-roller 36 and strap 37 are carried. The pole 38 has been broken away; but it is obvious it may be of any desired character.

From the foregoing description the operation of this invention will be apparent, and the plow can be lowered into operation or raised therefrom by the manipulation of the lever 19, while the inclination of the angle-face of the plow can be varied by an adjustment of the gear-plate 26 and the draft of the plow correspondingly altered. By the arrangement of bolts and blade-knife the plow may be used as a surface-roughener and the thrust from the angle-face of the plow resisted.

It is obvious that changes may be made in the details of construction and configuration without departing from the spirit of this invention as defined by the appended claims.

Having described our invention, what we claim as new, and desire to secure by Letters Patent, is—

1. In a snow-plow, the combination with carriages, of a beam supported thereby, a plow mounted loosely upon said beam for vertical and angular movement independently of said beam, means supported upon the beam for sustaining the plow in an elevated position, and a draft device for maintaining the angular adjusted relation of said plow to said beam; substantially as specified.

2. In a snow-plow, the combination with carriages, of a beam supported thereby, a plow mounted loosely upon said beam for vertical and angular movement independently of said beam, means supported upon the beam for sustaining the plow in an elevated position, and a draft device extending from the angle-face of said plow and adjustably connected to the forward carriage; substantially as specified.

3. In a snow-plow, the combination with carriages, of a beam supported thereby, an angular plow carried by said beam, a pivoted lever connected to said plow to elevate and depress the same, an angle end to said lever adapted to bear on said plow, a link from said lever, and a hook connection carried by the plow; substantially as specified.

4. In a snow-plow, the combination with carriages, of a beam supported thereby, an angular plow carried by said beam, a pivoted lever connected to said plow to elevate and depress the same, an angle end to said lever adapted to bear on said plow, a link from said lever, a hook connection carried by the plow, and an apertured gear-plate for varying the point of connection of said beam with the front carriage; substantially as specified.

5. In a snow-plow, the combination with carriages, of a beam supported thereby, an angular plow carried by said beam, means supported upon the beam for raising and lowering said plow, a flexible connection between the nose of said plow and the front end of said beam, and a flexible draft connection between the rear carriage and the plow; substantially as specified.

6. In a snow-plow, the combination with carriages, of a beam supported thereby, a plow beneath said beam, a vertically-adjustable roughening-blade having teeth extending at an angle to said beam and located upon an inclined face of said plow; substantially as specified.

7. In a snow-plow, the combination with carriages, of a beam supported thereby, an angular plow carried by said beam, means supported upon the beam for raising and lowering said plow, and a toothed rougheningplate carried by the inclined face of said plow and adjustably connected thereto for vertical movement; substantially as specified.

8. In a snow-plow, the combination with carriages, of a beam supported thereon, a plow having straight and angle faces and connected to said carriages by chains, a lever pivoted on said beam, a connecting-link extending from said plow to said lever, guide-blocks on opposite sides of said beam, a gear-plate extending from the angle-face of the plow to the front end of said beam and provided with adjusting-apertures, and blades projecting from the lower edge of the straight and angle faces of the plow; substantially as specified.

In testimony whereof we affix our signatures in presence of witnesses.

FREDRICK OLSON.
JACOB KAISER.
JOHN KNIVEL.

Witnesses as to F. Olson and J. Kaiser:
 WM. E. SMITH,
 JOHN B. CURTIS.
Witnesses as to John Knivel:
 CHARLES K. SHAND,
 JOHN B. CURTIS.